(12) United States Patent
Haesendonckx et al.

(10) Patent No.: US 9,102,090 B2
(45) Date of Patent: *Aug. 11, 2015

(54) METHOD AND DEVICE FOR BLOW MOLDING CONTAINERS

(75) Inventors: Frank Haesendonckx, Hamburg (DE); Matthias Gernhuber, Hamburg (DE); Pisarn Pasutanon, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 685 days.

This patent is subject to a terminal disclaimer.

(21) Appl. No.: 13/392,824

(22) PCT Filed: Jul. 22, 2010

(86) PCT No.: PCT/DE2010/000883
§ 371 (c)(1),
(2), (4) Date: May 22, 2012

(87) PCT Pub. No.: WO2011/023155
PCT Pub. Date: Mar. 3, 2011

(65) Prior Publication Data
US 2012/0226376 A1    Sep. 6, 2012

(30) Foreign Application Priority Data

Aug. 25, 2009   (DE) .......................... 10 2009 040 803

(51) Int. Cl.
B29C 49/78    (2006.01)
G05B 17/02    (2006.01)
(Continued)

(52) U.S. Cl.
CPC ................ B29C 49/78 (2013.01); G05B 17/02 (2013.01);
(Continued)

(58) Field of Classification Search
None
See application file for complete search history.

(56) References Cited

U.S. PATENT DOCUMENTS 4,076,071 A    2/1978    Rosenkranz et al.
5,346,386 A    9/1994    Albrecht et al.
(Continued)

FOREIGN PATENT DOCUMENTS

DE    2352926    4/1975
DE    4212583    10/1993
(Continued)

*Primary Examiner* — Monica Huson
(74) *Attorney, Agent, or Firm* — Lucas & Mercanti, LLP; Klaus P. Stoffel

(57) ABSTRACT

Method and device for blow molding containers, wherein a preform made of a thermoplastic material is shaped to give a container using blow molding pressure in a blow mold once the preform has been subjected to a thermal conditioning step in the region of a heating section along a transport path, and wherein at least one parameter characterizing the blow molding process is measured and supplied to a control device which acts upon at least one adjusting element to change at least one parameter influencing the blow molding process. The control device (51) calculates at least one property of the finished blow-molded container (2) based on the measured parameters characterizing the blow molding process and using a simulation model (48) and compares said property with a set value. Based on a possible deviation between the set value and the actual value, the parameter influencing the blow molding process is changed such that a possible remaining deviation is minimized.

16 Claims, 6 Drawing Sheets

(51) Int. Cl.
  *B29C 49/06* (2006.01)
  *B29C 49/12* (2006.01)
  *B29C 49/36* (2006.01)
  *B29C 49/64* (2006.01)
  *B29C 49/48* (2006.01)
  *B29K 23/00* (2006.01)
  *B29K 67/00* (2006.01)

(52) U.S. Cl.
  CPC ............... *B29C 49/06* (2013.01); *B29C 49/12* (2013.01); *B29C 49/36* (2013.01); *B29C 49/6445* (2013.01); *B29C 49/783* (2013.01); *B29C 2049/1257* (2013.01); *B29C 2049/1271* (2013.01); *B29C2049/4889* (2013.01); *B29K 2023/12* (2013.01); *B29K 2067/00* (2013.01)

(56) References Cited

U.S. PATENT DOCUMENTS

| 5,648,026 | A | 7/1997 | Weiss |
| 6,304,794 | B1 | 10/2001 | Nishimine et al. |
| 7,491,358 | B2 | 2/2009 | Gernhuber et al. |
| 7,887,742 | B2 | 2/2011 | Linke et al. |
| 8,758,670 | B2 * | 6/2014 | Haesendonckx et al. ..... 264/535 |

FOREIGN PATENT DOCUMENTS

| DE | 4340291 | 6/1995 |
| DE | 19906438 | 8/2008 |
| WO | 9737823 YA | 10/1997 |
| WO | 02087850 Y | 11/2002 |
| WO | 2007110018 A | 10/2007 |

* cited by examiner

METHOD AND DEVICE FOR BLOW MOLDING CONTAINERS

The present application is a 371 of International application PCT/DE2010/000883, filed Jul. 22, 2010, which claims priority of DE 10 2009 040 803.7, filed Aug. 25, 2009, the priority of these applications is hereby claimed and these applications are incorporated herein by reference.

BACKGROUND OF THE INVENTION

The invention relates to a method for blow molding containers, in which, after thermal conditioning, a preform of a thermoplastic material is deformed into a container within a blow mold by the influence of blowing pressure along a transport path in the area of a heating section, and wherein at least one parameter characterizing the blow molding process is measured and supplied to a control device, which acts on at least one adjusting element for changing at least one of the parameters which influence the blow molding process.

The invention moreover relates to a device for blow molding containers of a thermoplastic material, which includes at least one heating section arranged along a transport path of a preform and at least one blow molding station provided with a blow mold, and wherein a control device is used, and has at least one sensor for measuring at least one parameter which characterizes the blow molding process, wherein the sensor is connected to the control device.

In the formation of containers by the influence of blowing pressure, preforms of a thermoplastic material, for example, preforms of PET (polyethylene terephthalate), are supplied within a blow molding machine to different processing stations. Such a blow molding machine typically has a heating device as well as a blowing device in whose area the preform which has previously been thermally conditioned is expanded into a container biaxial orientation. The expansion takes place by means of compressed air which is introduced into the preform to be expanded. The technical procedure in such an expansion of the preform is explained in DE-OS 43 40 291. The introduction of the pressurized gas, mentioned above, also includes the introduction of compressed gas into the developing container bubble, as well as the introduction of compressed gas into the preform at the beginning of the blow molding process.

The basic construction of a blow molding station for deforming containers is described in DE-OS 42 12 583. Possibilities for thermally conditioning the preforms are explained in DE-OS 23 52 926.

Within the device for blow molding, the preforms, as well as the blow molded containers, can be transported by means of various manipulating devices. Particularly useful has been found the use of transport mandrels onto which the preforms are placed. However, the preforms can also be manipulated by means of other support devices. The use of gripping tongs for manipulating preforms and the use of expanding mandrels, which for support can be introduced into an opening area of the preform, also belong to the available constructions.

A manipulation of containers with the use of transfer wheels is described, for example, in DE-OS 199 06 438 in an arrangement of the transfer wheel between a blow molding wheel and a deliver section.

The manipulation of preforms already mentioned above takes place, on the one hand, in the so-called two-stage method, in which the preforms are initially manufactured by a blow molding process, are subsequently intermediately stored, and are only conditioned later with respect to their temperature and blown into a container. On the other hand, the use of the so-called single-stage methods in which the preforms are, immediately following their production by means of injection molding and a sufficient solidification, suitably thermally conditioned and subsequently blown up.

With respect to the blow molding stations used, various embodiments are known in the art. In blow molding stations which are mounted on rotating transport wheels, a book-like opening of the mold carriers can be frequently found. However, it is also possible to use mold carriers which are slidable relative to each other, or are guided in some other manner. In stationary blow molding stations, that are particularly suitable for accommodating several cavities for the formation of containers, typically plates that extend parallel to each other are used as mold carriers.

Prior to carrying out heating, the preforms are typically placed on transport mandrels which transport the preform either through the entire blow molding machine, or which rotate only in the area of the heating device. In stationary heating for the preforms, such that the openings of the preforms are oriented downwardly in the vertical direction, the preforms are usually placed on a sleeve-shaped holding element of the transport mandrel. In suspended heating for the preforms, in which the preforms are oriented with their openings upwardly in the vertical direction, usually spreading mandrels are inserted into the openings of the preforms which clamp the preforms.

When carrying out a container formation by utilizing blow molding technology, a significant object is to achieve a predetermined material distribution in the container wall. A significant parameter for predetermining the resulting material distribution is the heat distribution realized prior to blow molding in the preforms.

The heat distribution is typically realized in such a way that, in a circumferential direction of the preforms, an equal temperature level is produced, and a temperature profile is produced in a longitudinal direction of the preforms. Moreover, also through the wall of the preform, a suitable temperature profile from the outside to the inside is predetermined. Basically, it can be assumed that areas of the preform with a lower temperature lead to thicker wall areas of the blown container, and that the warmer areas of the preform are stretched to a greater extent when carrying out the blow molding deformation and, as a result, lead to thinner wall areas of the blow molded container.

The temperature in the area of the preforms can be measured with so-called pyrometers. A measurement of an actual wall thickness in the area of the blown containers can be effected by means of so-called wall thickness sensors which operate for example optically, or with the use of sound waves.

Further significant parameters for influencing the material distribution in the blow molded container are the stretching speed, the relationship with respect to time of the stretching process relative to the blow gas supply, the volumetric flow of the blow molding gas, as well as the pressure pattern over time in the expansion of the preforms into containers. In particular, the control of the actual blowing pressure has been found to be difficult because, between a control valve for presetting the blowing pressure and the preform to be expanded, there is a flow path with different cross-sectional sizes of the lines and throttles which influence the flow and, moreover, the volume increase of the preforms during the deformation into the container causes a return reaction to the pressure which is generated. On the other hand, moving the stretching rod into the preform results in a reduction of the available volume. Moreover, there are relatively complex interactions between individual parameters which influence the concrete actual material distribution in the blow molded container.

The large number of parameters and the interactions between the parameters have the result that, instead of an actual regulation, frequently only a control takes place with the consideration of empirically determined and manually predetermined adjustments. Actually realized regulations typically refer to individual parameters, without sufficiently taking into consideration the complexity of the blow molding process.

In typical controls, an adjustment to influencing parameters, which are unknown or changeable with respect to time, is effected in that an operator of the blow molding machine examines the produced bottles, and manually changes parameters of the blow molding process through the use of a control panel. Such a procedure has the result that, initially a plurality of bottles are produced whose properties deviate from the predetermined desired values and, partially iteratively an approximation to the ideal bottle configuration takes place. Even if properties of the blow molded bottles are measured and there is a back coupling within the scope of regulations, initially the regulation deviations must occur in order to be able to react to them. Moreover, the existing regulation concepts have, because of the complex interactions between the individual blow molding parameters, weaknesses occur which lead to regulations of deviations which are not satisfactory or result in long regulation times.

SUMMARY OF THE INVENTION

It is the object of the present invention to improve the method mentioned above in such a way that with inexpensive machinery a high-quality container formation is reinforced while the throughput rates are high at the same time.

In accordance with the invention, this object is met in that, with the use of a simulation model, based on the measured parameters characterizing the blow molding process, at least one property of the finished blow molded container is computed and is compared to a desired value and that, based upon an eventual deviation between the desired value and the actual value, the parameter influencing the blow molding process is changed in such a way that an eventually remaining deviation is minimized.

Another object of the present invention is to construct a device of the above-mentioned type in such a way that high throughput rates are reinforced with a simple construction and good product quality.

In accordance with the invention, this object is met in that the control device includes a simulation model which, based on the measured parameters characterizing the blow molding process, at least one property of the finished blow molded container is computed and is compared to a desired value and that, based upon an eventual deviation between the desired value and the actual value, the parameter influencing the blow molding process is changeable by the control element in such a way that an eventually remaining deviation is minimized.

The control or regulation of the blow molding process, while taking into consideration a parameter characterizing the blow molded container, and taking into consideration the interactions between individual influencing factors by the simulation model of the blow molding process, facilitates an extremely high quality container production, because predetermined desired values with low tolerances are maintained and a regulation of harmful influences can take place with little time delay. The simulation model takes into consideration particularly flow cross sections and flow resistances in the areas of blow gas supply, interactions between the occurring pressure, the volumetric flow of blow molding gas, as well as volumetric changes due to the developing container bubble and the respective positioning of the stretching rod, as well as any given further influencing factors such as, for example, the temperature of the preforms, the temperature distribution in the walls of the preforms, as well as the blow mold temperature. Basically, it is possible to include any additional influencing factors into the simulation model of the blow molding process.

For a quick regulation of occurring problems and for avoiding the occurrence of such problems a significant contribution is the fact that the simulation model not only simulates the physical sequences of the blow molding process, but that the entire manufacturing process of the blow molding process is simulated, and that, as a result, without a necessary measurement of actual properties of the blow molded container, the properties of the blow molded container can be predetermined with a very high reliability, just on the basis of the existing parameters of the heating process, the blow molding process, as well as the materials used. Consequently, it is especially possible, prior to a production of containers which will have the undesired properties, to influence the production process in such a way that the manufacture of containers having undesired properties is prevented.

For example, it is possible, with the use of expert knowledge, which can be made available to the control device in digitalized form to carry out the respective simulations. The corresponding expert knowledge can refer, for example, to the process procedures of the heating process as well as the blow molding process. In addition, the simulation model can take into consideration the expert knowledge concerning material properties of the thermoplastic material used, as well as the blow molded containers and of the blow molded containers made of this material. Important in this connection are material properties, material distributions in the preform and in the blow molded bottle as well as the bottle contour. In particular, the information concerning bottle contour refers to the contour as immediately following the termination of the blow molding process, the contour after a removal of the container from the blow mold, the contour after an eventual reverse shrinkage, as well as the contour in the state of use, for example, with a filled carbonized beverage. The simulation model can determine, for example, different properties of the blow molded container, for example, the stacking capability of the containers, the gripping stability, as well as the behavior of the container under the influence of pressure.

With respect to the present invention, the terms referring to regulation, as well as the terms referring to control, are used by way of example hereinabove and below. Basically, all processes referred to as control can also be realized as regulation, and all processes referred to as regulation can also be carried out as control in a simplified embodiment. Also, it is possible to carry out a regulation, or to carry out an additional control to the procedures explained, with respect to regulation.

A simulation which is close to reality can be carried out by evaluating at least one parameter characterizing the blow molding process, selected from the group including preform temperature, temperature distribution in the preform, blow pressure sequence, stretching sequence, material properties, material distribution in the preform, material properties in the blow molded container, container contour, ambient parameters.

A high coincidence between the simulated values and the actual values can be achieved when the simulation model carries out the simulations with the use of expert knowledge.

Meaningful results are made available, when, in the simulation of properties of the blow molded containers carried out by the simulation model, at least one parameter of the blow molded container, selected from the group including material distribution in the blow molding container, container contours under pressure load, stacking capability of the container, gripping stability of the container, pressure behavior of the container, is simulated.

An adaptive simulation model is made available by comparing at least one simulated value of the blow molded container with a property of an actual blow molded container.

In particular, a good coincidence between simulated values and actual values can be made available by carrying out a measurement of at least one parameter of the blow molded container.

The manufacture of blow molded containers with small deviations from the desired parameters is reinforced by using the simulation model within a closed regulating circuit.

A fast regulation of interference values is reinforced by using the simulation model as part of a cascade regulation.

BRIEF DESCRIPTION OF THE DRAWING

In the drawings.

In the drawings, embodiments of the invention are schematically illustrated. In the drawing.

DETAILED DESCRIPTION OF THE INVENTION

Figure 1:
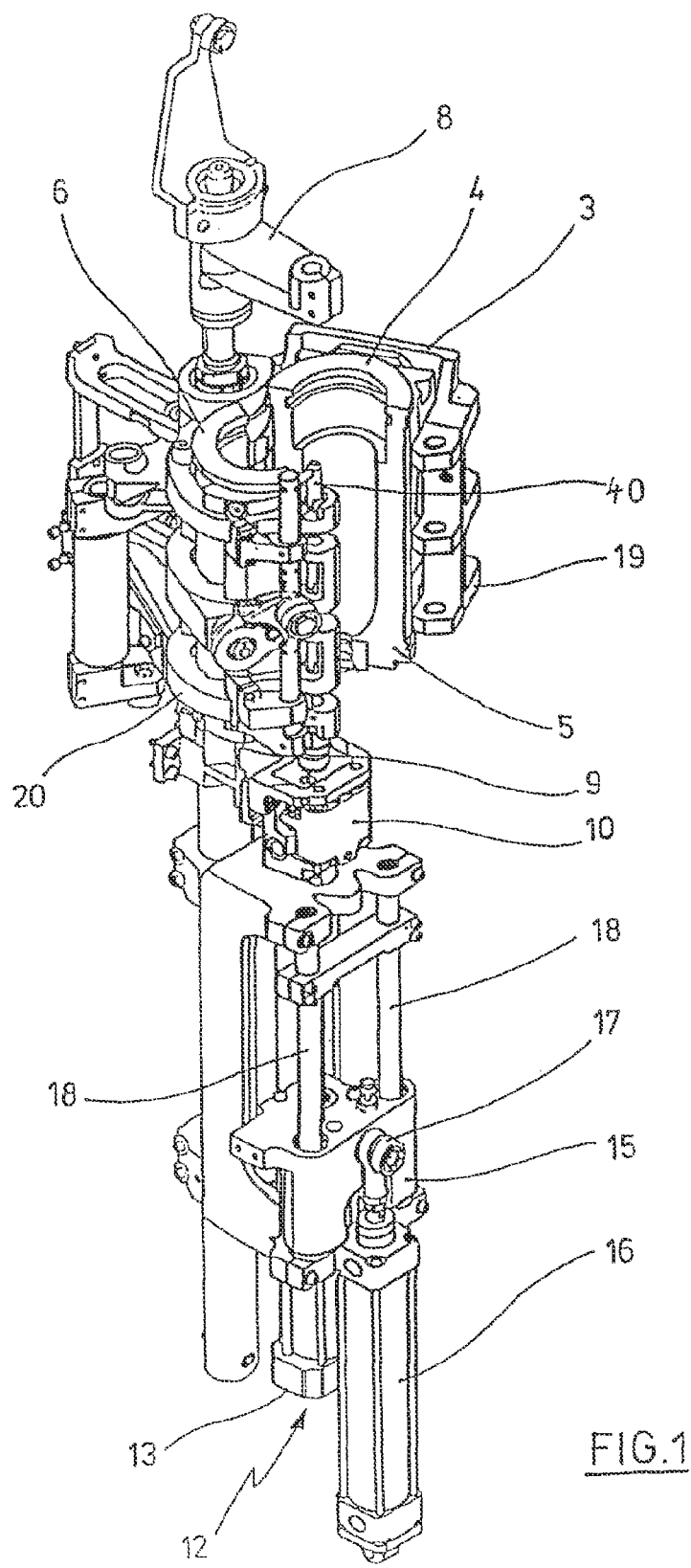
FIG. 1 is a perspective illustration of a blow molding station for manufacturing containers from preforms.
Figure 2:
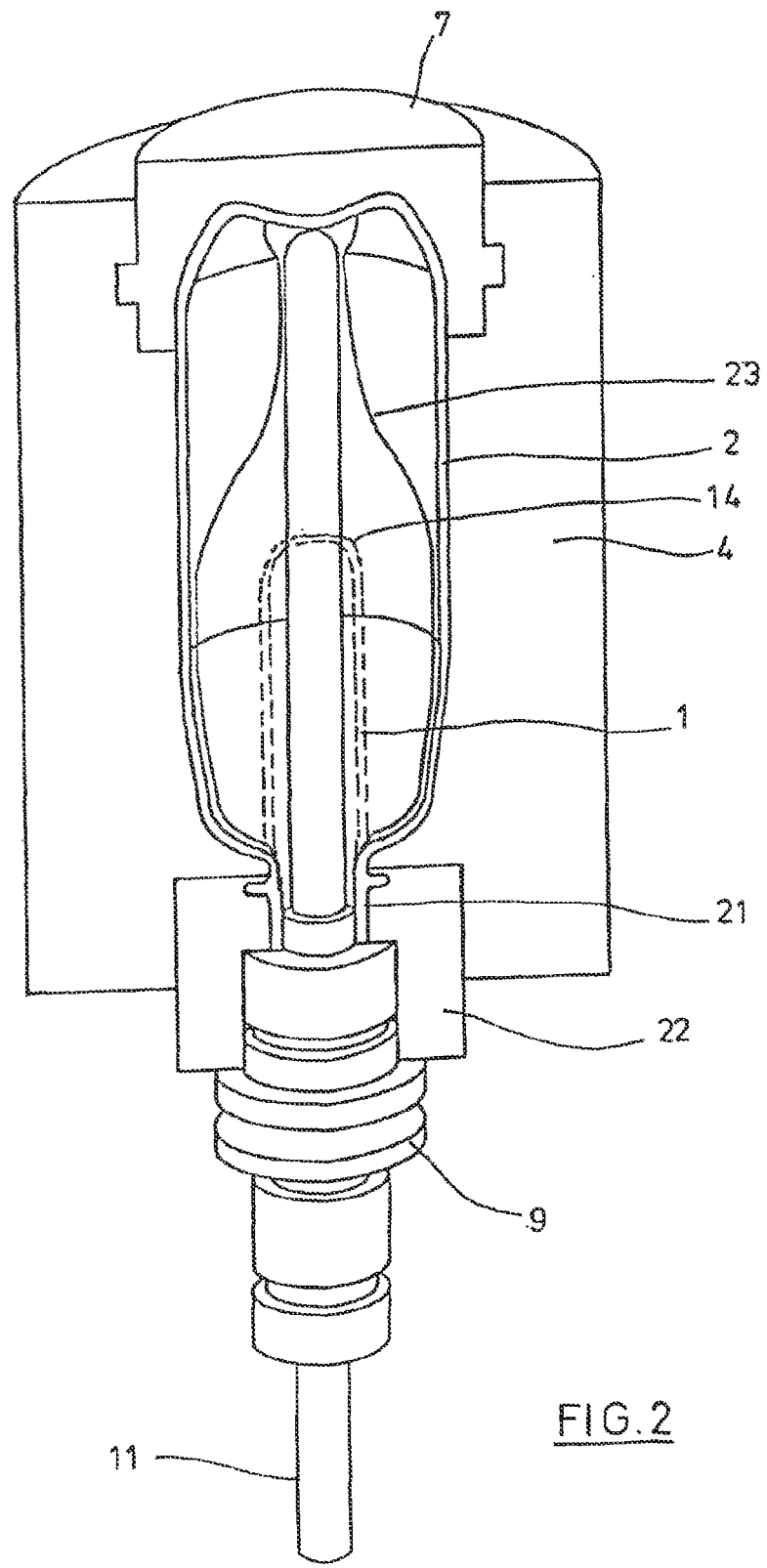
FIG. 2 is a longitudinal sectional view through a blow mold in which a preform is stretched and expanded.

The principal construction of a device for deforming preforms 1 into containers 2 is illustrated in FIG. 1 and FIG. 2.

The device for forming the container 2 consists essentially of a blow molding station 3 which is provided with a blow mold 4 into which a preform 1 can be placed. The preform 1 may be an injection molded part of polyethylene terephthalate. For facilitating a placement of the preform 1 into the blow molds 4 and for facilitating a removal of the finished containers 2, the blow mold 4 is composed of mold halves 5, 6 and a bottom part 7 positioned by means of a lifting device 8. The preform 1 can in the area of the blow station 3 be held by a transport mandrel 9 which, together with the preform 1, travels through a plurality of treatment stations within the device. However, it is also possible to place the preform 1 directly into the blow mold 4 through tongs or other manipulating means.

For facilitating a compressed air supply, underneath the transport mandrel a connecting piston 10 is arranged which supplies compressed air to the preform 1 and simultaneously effects a sealing action relative to the transport mandrel 9. In a modified construction it is basically also conceivable to use fixed compressed air supply lines.

Stretching of the preform 1 takes place in this embodiment, by means of a stretching rod 11, which is positioned by a cylinder 12. In accordance with another embodiment, a mechanical positioning of the stretching rod 11 is carried out through curved segments; in particular, it is useful if a plurality of blow molding stations 3 are arranged on a rotating blow wheel.

In the embodiment illustrated in FIG. 1, the stretching system is constructed in such a way that a tandem arrangement of two cylinders 12 is made available. From a primary cylinder 13, the stretching rod 11 is initially, prior to the beginning of the actual stretching procedure, moved into the area of a bottom 14 of the preform 1. During the actual stretching process, the primary cylinder 13 is positioned with extended stretching rod, together with a carriage 15 supporting the primary cylinder by a secondary cylinder 16 or a cam control. In particular, it is intended to use the secondary cylinder 16 with cam control in such a way that a guide roller 17, which while the stretching process is carried out slides along a cam track, predetermines an actual stretching position. The guide roller 17 is pressed by the secondary cylinder 16 against the guide track. The carriage 15 slides along two guide elements 18.

After closing of the mold halves 5, 6 arranged in the area of carriers 19, 20 has been carried out, the carriers 19, 20 are locked relative to each other by means of a locking device 20.

For adapting to different shapes of an opening section 21 of the preform 1, according to FIG. 2, the use of separate threaded inserts 22 in the area of the blow mold 1 is provided for.

FIG. 2 shows, in addition to the blow molded container 2, also in broken lines, the preform 1 and schematically a container bubble 23 which is developing.

Figure 3:
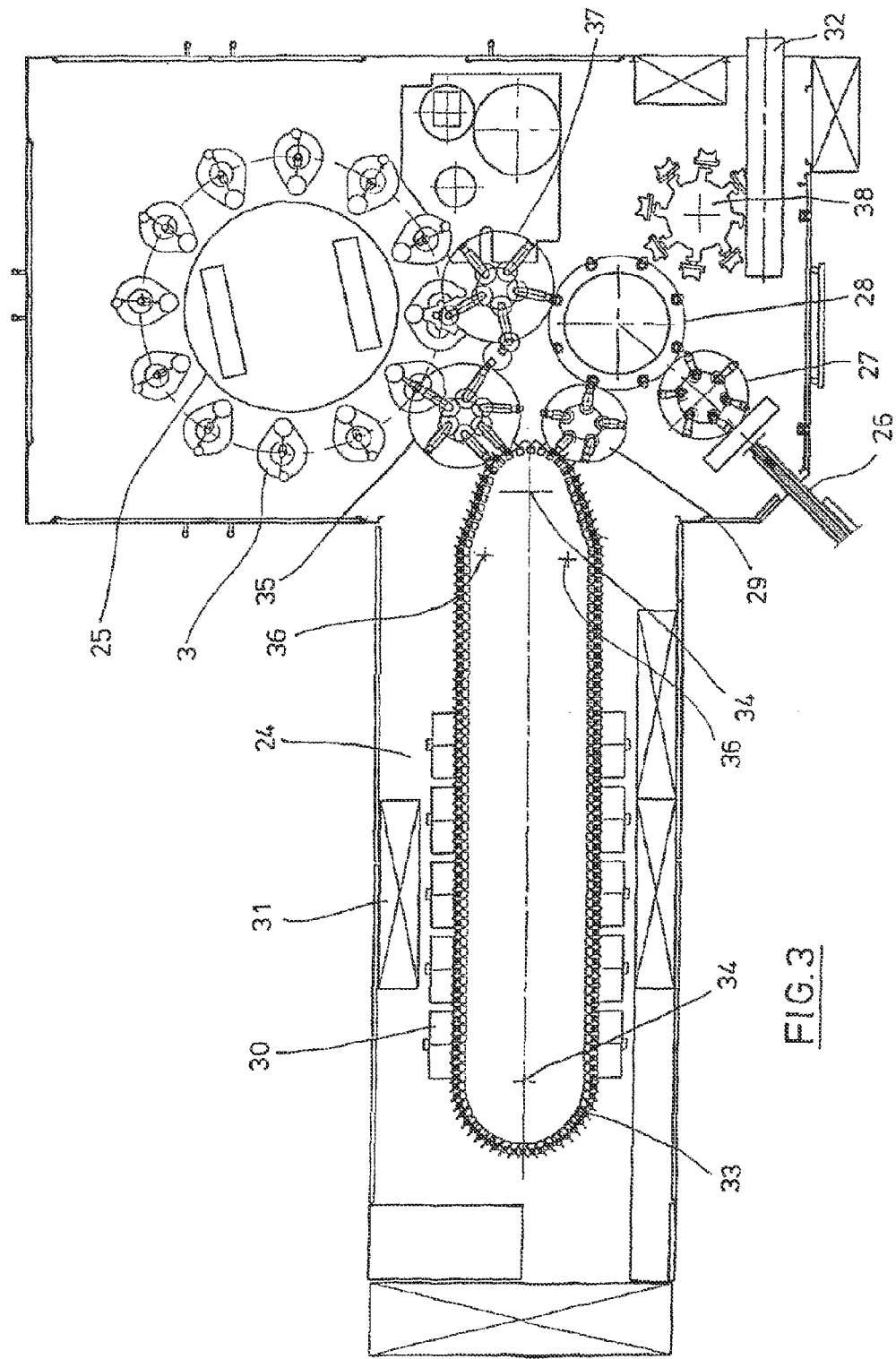
FIG. 3 is a sketch explaining a principle construction of a device for blow molding containers.

FIG. 3 shows the basic construction of a blow molding machine which is provided with a heating section 24 as well as a rotating blow wheel 25. Starting from a preform inlet 26, the preforms 1 are transported by means of transfer wheels 27, 28, 29 into the area of the heating section 24. A heating element 30 as well as a blower 31 are arranged along the heating section 24 in order to adjust the temperature of the preforms 1. After a sufficient thermal conditioning of the preforms 1, the preforms are transferred to the blow wheel 25 in whose area the blow stations 3 are arranged. The finished blow molded containers 2 are conveyed by additional transfer wheels to an output section 32.

In order to be able to deform a preform 1 in such a way that the container 2 has material properties which ensure that a long use of the foodstuff, especially beverages, is made possible, special method steps have to be adhered to when heating and orienting the preforms 1. Moreover, advantageous effects can be achieved by adhering to special dimensioning rules.

Different synthetic materials can be used as thermoplastic material. For example, PET, PEN or PP can be used.

The expansion of the preform 1 during the orienting process takes place by supplying compressed air. The compressed air supply is divided into a pre-blowing phase, in which gas, for example compressed air, with a low pressure level is supplied and, into a subsequent principal phase in which gas with a higher pressure level is supplied. During the pre-blowing phase, typically compressed air is used with a pressure in intervals of 10 bar to 25 bar and with a pressure in intervals of 25 bar to 40 bar during the principal blowing phase.

In FIG. 3 it can also be seen that, in the illustrated embodiment, the heating section 24 is formed of a plurality of circumferential revolving transport elements 33 which are arranged in a row in the manner of a chain and are guided by guide wheels 34. It is especially intended to stretch out an essentially rectangular basic contour by the chain-like arrangement. In the illustrated embodiment, in the area of the extension of the heating section 24 facing the transfer wheel 21 and an input wheel 35, a single guide wheel 34 having a relatively large dimension, and in the area of adjacent guides, two guide wheels 36 having comparatively smaller dimensions are used. However, other types of guides are also conceivable.

For facilitating an arrangement of the transfer wheel 29 and the input wheel 35 which is as tight as possible, the illustrated arrangement is found to be especially useful because three guide wheels 34, 36 are positioned, namely, the smaller guide wheels 36 in the area of the transition to the linear patterns of the heating section 24, and the larger guide wheel 34 immediately in the transfer area to the transfer wheel 29 and the input wheel 35. Alternatively, for the use of chain-like transport elements 33 it is possible, for example, to use a rotating heating wheel.

After blow molding of the containers 2, the containers 2 are guided by a discharge wheel 37 out of the area of the blow molding stations 3, and through the transfer wheel 28 and a discharge wheel 38 to the delivery section 32.

Figure 4:
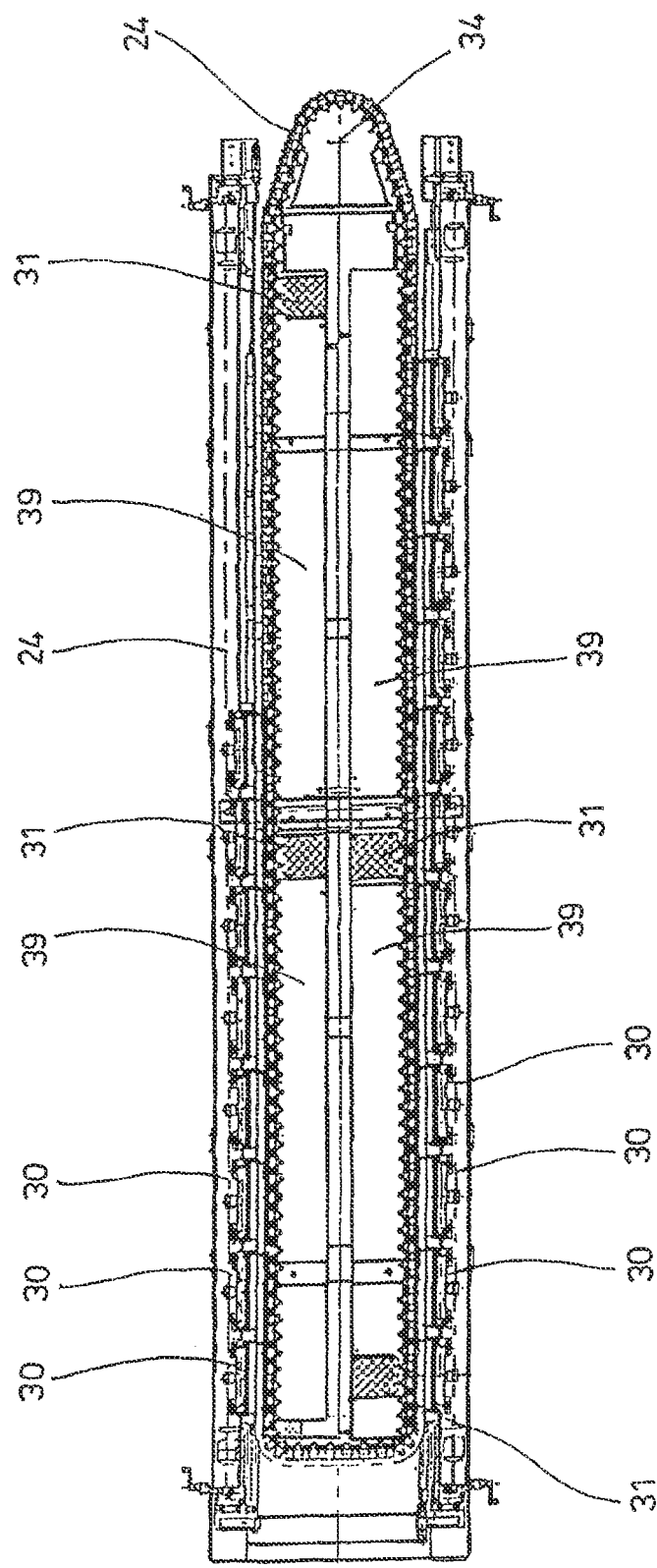
FIG. 4 shows a modified heating section with enlarged heating capacity.

In the modified heating section 24 illustrated in FIG. 4, due to the larger number of heating elements 30, a greater quantity of preforms 1 can be thermally conditioned per unit of time. The blowers 31 conduct cooling air into the area of cooling air ducts 39 which are located opposite the corresponding heating elements 30 and discharge the cooling air through outlet openings. By the arrangement of the discharge directions, a flow direction for the cooling air essentially transversely of the transport direction of the preforms 1 is realized. The cooling air ducts 39 can have, in the area of surfaces located opposite the heating elements 30, reflectors for the heating radiation; it is also possible to realize a cooling of the heating elements by the discharged cooling air.

Figure 5:
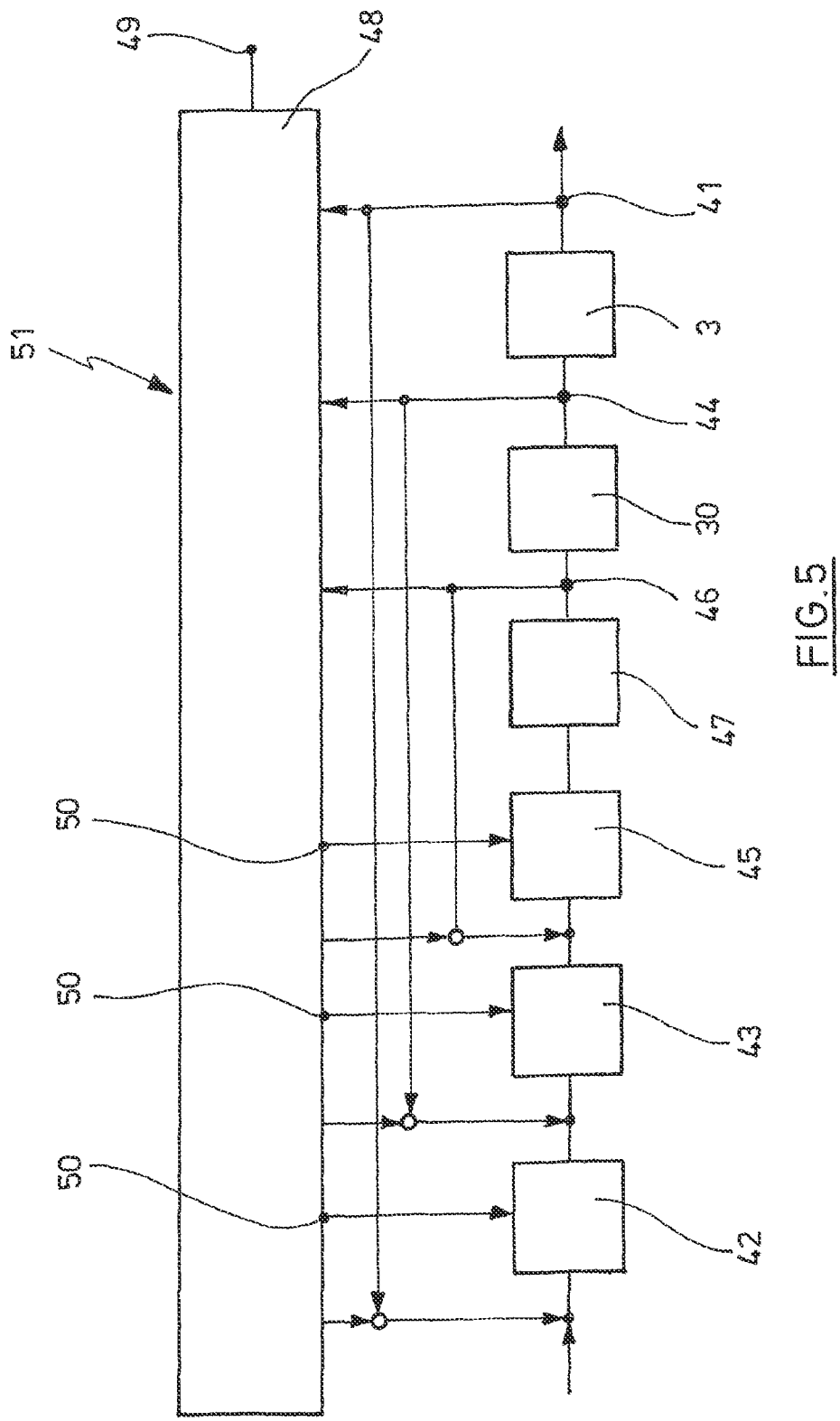
FIG. 5 is a schematic illustration of a regulation concept for regulating the temperature, and of blow molding with the use of a simulation model.

FIG. 5 shows a schematic representation of a regulating system for the heating elements 30 or, respectively, for radiator tubes in an outer control circuit, and for one or more parameters concerning the blow gas supply in an inner regulating circuit. The regulating system is constructed in the form of a cascade regulation. An outer regulating circuit determines, by means of the measuring device 41, and following the blowing station 3, the wall thickness 2 of the container 2, to at least a predetermined vertical level, and supplies this actual value to the input of a wall thickness regulator 42. Basically, any other or additional parameters can be measured and taken into consideration by the regulation. The immediate input value for the wall thickness regulator 42 is the regulating difference between a predetermined wall thickness and the measured wall thickness. A starting value of the wall thickness regulator 42 constitutes the desired value for an inner temperature regulating circuit.

The difference between the starting value of the wall thickness regulator 42 and a temperature value measured by a temperature sensor 44 of the preform 1 on a predetermined vertical level is supplied as direct control value to a temperature regulator 43.

The innermost and, thus, fastest regulating circuit of the cascade regulation illustrated in FIG. 8 [sic] comprises one or more blow gas regulators 45. The blow gas regulator 45 can be constructed for regulating, for example, a pressure and/or a volumetric flow of the blow gas. A regulating difference between an actual value made available by a sensor 46 to the blow gas regulator 45, and the respectively regulated blow gas parameter is made available as the actual value, which results as a starting value of a corresponding regulating section 47.

At least one of the regulators 42, 43, 45 is advantageously constructed with an integral behavior for avoiding regulation differences. In accordance with another regulating variation, the regulation takes into consideration a dead time behavior of the regulation system on the basis of the lengths of the transport paths of the preforms 1 or the containers 2. In this connection, it is being taken into consideration that a delay known in dependence on the transport speed between a regulation value change and a change of the starting value, is present.

As an alternative to the cascade-like realization of the regulation concept illustrated in FIG. 5, any other regulation structures can be realized. In cascade-like structures it has been found useful to regulate quickly changeable process parameters in the inner circuits, and to regulate slowly changing process parameters in the outer regulating circuits.

At least one of the measurement values supplied by the sensors 41, 44, 46 is supplied to a simulation model 48. Moreover, the simulation model 48 has one or more sensor inlets 49 for taking into consideration any additional information with respect to the blow molding process. Moreover, the simulation model has one or more model outlets 50 which facilitate influencing the regulating behavior. In accordance with an embodiment, the regulating characteristic is changed by means of one of the regulators 42, 43, 45 through the model outlet 50. In accordance with another embodiment, it is also being considered as an alternative or supplement to influence the input value of at least one of the regulators 42, 43, 45. This influencing can be carried out in addition to the influence caused by the sensors 41, 44, 46. It is also possible to replace at least one of the signals of the sensors 41, 44, 46 with a value available at the model outlet 50.

When the regulation is carried out, the simulation model 48 makes it possible to take complex relationships between the individual parameters into consideration. In particular, delays, dead times and non-linearities can be taken into consideration. Moreover, the simulation model 48 also makes it possible to include process values into the regulation which could not be measured directly by measurement technology or could be measured only by difficult or expensive measurement technology.

The regulation of a container manufacture can take place, for example, on the basis of a predetermined pressure pattern for the blow pressure. If in a comparison of the measured values with the values generated by the simulation model, deviations in at least one of the measured parameters are recognized, for example, for each of the product cycles, the starting point for supplying the pre-blowing pressure can be changed and/or it is possible to increase or decrease the speed of the stretching process in a suitable manner. This can be carried out particularly by predetermining the respective travel speed of the stretching rod into the preform 1 to be stretched. It is also being considered to carry out an adjustment or the temperature profile and/or the heating power.

By using the simulation model 48, it is especially possible to coordinate the measured results of the bottle simulation with the properties of actually blow molded bottles.

The use of the simulation model 48 is possible, on the one hand, within the framework of control alone. In particular, however, it is intended to make available a back-coupled regulating system which is incorporated into the control of a blow molding machine. By a regulation of this type, it is also particularly possible to take into consideration changes in the ambient conditions.

Figure 6:
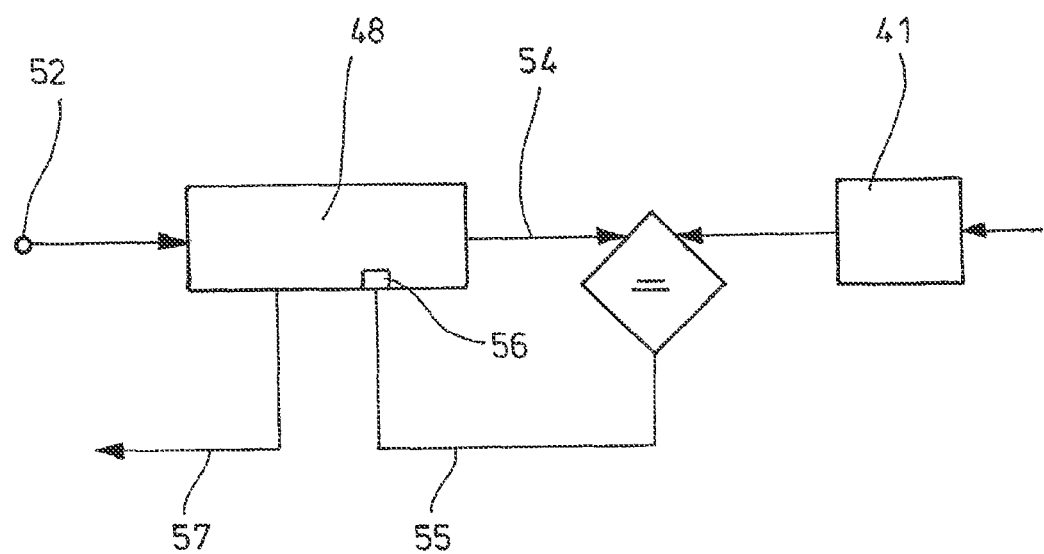
FIG. 6 is a schematic illustration of a variation of the use of the simulation model.

As an alternative or supplement to the use of the simulation model 48 shown in FIG. 5, it is also possible to use the simulation model in accordance with the illustration in FIG. 6. In that case, information concerning a temperature profile 52 is supplied to the simulation model 48. The measuring device 41 measures the wall thickness or a wall thickness distribution in the area of the blow molded container 2, and is supplied to a difference computation 53. The difference computation 53 receives as the starting value 54 of the simulation model 48, intended values for the wall thickness or a wall thickness distribution. A corresponding deviation 55 is supplied to a difference input of the simulation model 48. Taking into consideration the information which has been taken in, the simulation model 48 makes available the correction values 57 for the temperature profile. The temperature profile typically concerns the temperature distribution of the preform 1 in its longitudinal direction and/or the temperature distribution between the inner or outer limitations of the preform walls.

Consequently, the deviation between simulated values for the wall thickness and actually measured process parameters with respect of the wall thickness is evaluated.

The invention claimed is:

1. A method of blow molding containers, comprising the steps of: deforming a preform of a thermoplastic material, after a thermal conditioning along a transport path in an area of a heating section within a blow mold by influence of blowing pressure in a container; measuring and supplying at least one parameter characterizing a deformation process to a control device which, for changing at least one parameter influencing a blow molding process, acts on at least one adjusting element, wherein the control device, using a simulation model and based on the simulation model, computes at least one property of a finished blow molded container and compares a computed value to a desired value; and, based on an eventual deviation between the desired value and the actual value, changing the parameter influencing the blow molding process so that an eventually remaining deviation is minimized.

2. The method according to claim 1, including evaluating at least one parameter characterizing the blow molding process, selected from the group consisting of: preform temperature; temperature distribution in the preform; blow pressure pattern; blow gas volumetric flow; stretching pattern; material properties; material distribution in the preform; material distribution in the blow molded container; container contour; and ambient parameters.

3. The method according to claim 1, wherein the simulation model carries out the simulation using expert knowledge.

4. The method according to claim 1, wherein the simulation of properties of blow molded containers carried out by the simulation model includes simulating at least one parameter of the blow molded container selected from the group including material distribution in the blow molded container, container contour under pressure load, stacking capability of the container, gripping stability of the container, pressure behavior of the container.

5. The method according to claim 1, includes comparing at least one simulated value of the blow molded container to a property of an actually blow molded container.

6. The method according to claim 1, including carrying out a metrologic determination of at least one parameter of the blow molded container.

7. The method according to claim 1, including using the simulation model within a closed regulating circuit.

8. The method according to claim 7, including using the simulation model as part of a cascade regulation.

9. A device for blow molding containers of a thermoplastic material, comprising: at least one heating section arranged along a transport path of a preform; at least one blow molding station provided with a blow mold, and in which a control device is used; and at least one sensor for measuring at least one parameter characterizing a blow molding process, wherein the sensor is connected to the control device, wherein the control device includes a simulation model which, based on the measured parameters characterizing the blow molding process, at least one property of a finished blow molded container is computed and compared to a desired value, wherein, based on an eventual deviation between the desired value and an actual value, the parameter influencing the blow molding process can be changed by an adjusting element, so that an eventually remaining deviation is minimized.

10. The device according to claim 9, wherein the simulation model is configured for evaluating at least one parameter characterizing the blow molding process selected from the group consisting of: preform temperature; temperature distribution in the preform; blow pressure pattern; blowing gas volumetric flow; stretching pattern; material properties; material distribution in the preform; material distribution in the blow molded container; container contour; and ambient parameters.

11. The device according to claim 9, wherein the simulation model is configured for evaluation of digitalized expert knowledge.

12. The device according to claim 9, wherein the simulation model is configured for evaluating at least one parameter of the blow molded container selected from the group including material distribution in the blow molded container, container contour under pressure load, stacking capability of the container, gripping stability of the container, and pressure behavior of the container.

13. The device according to claim 9, wherein the simulation model includes a comparison device for coordinating simulated properties of the blow molded container with properties of an actual blow molded container.

14. The device according to claim 9, wherein the at least one sensor for measuring at least one parameter of the blow molded container is connected to the simulation model.

15. The device according to claim 9, wherein the simulation model is arranged within a regulating circuit.

16. The device according to claim 15, wherein the regulating circuit is configured as a cascade regulation.

\* \* \* \* \*